US012684364B2

(12) United States Patent
Lin

(10) Patent No.: US 12,684,364 B2
(45) Date of Patent: Jul. 14, 2026

(54) COMMUNICATION DEVICE WITH SPATIAL REUSE MECHANISM FOR SCHEDULING TRANSMISSION AND ASSOCIATED TRANSMISSION SCHEDULE METHOD

(71) Applicant: Realtek Semiconductor Corp., HsinChu (TW)

(72) Inventor: Cheng-Feng Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 321 days.

(21) Appl. No.: 18/412,980

(22) Filed: Jan. 15, 2024

(65) Prior Publication Data
US 2024/0267743 A1 Aug. 8, 2024

(30) Foreign Application Priority Data
Feb. 2, 2023 (TW) ................................. 112103552

(51) Int. Cl.
| | |
|---|---|
| *H04W 16/14* | (2009.01) |
| *H04W 72/044* | (2023.01) |
| *H04W 72/0446* | (2023.01) |
| *H04W 76/15* | (2018.01) |

(52) U.S. Cl.
CPC ....... *H04W 16/14* (2013.01); *H04W 72/0446* (2013.01); *H04W 72/046* (2013.01); *H04W 76/15* (2018.02)

(58) Field of Classification Search
CPC ............... H04W 72/04; H04W 72/044; H04W 72/0446; H04W 72/046; H04W 16/14; H04W 72/50; H04W 72/54; H04W 76/10; H04W 76/15; H04L 27/0006; H04L 5/0023; H04L 5/0025
See application file for complete search history.

(56) References Cited

U.S. PATENT DOCUMENTS

| | | | |
|---|---|---|---|
| 2017/0041798 A1 | 2/2017 | Li | |
| 2020/0077273 A1 | 3/2020 | Cherian | |
| 2020/0120690 A1 | 4/2020 | Handte | |
| 2021/0144558 A1* | 5/2021 | Parthasarathy | H04L 5/0073 |
| 2024/0031828 A1* | 1/2024 | Yu | H04L 5/0023 |
| 2024/0373456 A1* | 11/2024 | Iwai | H04W 74/0816 |
| 2025/0119191 A1* | 4/2025 | Lou | H04B 7/088 |
| 2025/0203431 A1* | 6/2025 | Verenzuela | H04W 76/14 |

* cited by examiner

*Primary Examiner* — Paul H. Masur
(74) *Attorney, Agent, or Firm* — Winston Hsu

(57) ABSTRACT
A communication device respectively establishes a plurality of wireless communication connections with a plurality of predetermined devices in an infrastructure network, and includes a wireless transceiver and a processor. The wireless transceiver transmits or receives wireless signals. The processor selects a spatial reuse mechanism, generates spatial reuse information according to the spatial reuse mechanism, and transmits at least one packet carrying the spatial reuse information to the predetermined devices. The spatial reuse information defines a pattern of a communication period. The communication period comprises a spatial reuse phase and a non-spatial reuse phase. The spatial reuse information comprises time information of at least one of the spatial reuse phase and the non-spatial reuse phase. In response to a selection of the spatial reuse mechanism, the processor suspends a wireless signal transmission with the predetermined devices during the spatial reuse phase.

15 Claims, 7 Drawing Sheets

100

AID 1    AID 2    AID 3    AID 4

COMMUNICATION DEVICE WITH SPATIAL REUSE MECHANISM FOR SCHEDULING TRANSMISSION AND ASSOCIATED TRANSMISSION SCHEDULE METHOD

BACKGROUND OF THE INVENTION

1. Field of the Invention

The present invention is related to a transmission schedule, and more particularly, to a transmission schedule method that can effectively reduce transmission interference and an associated communication device.

2. Description of the Prior Art

Wi-Fi direct (also referred to as peer-to-peer (P2P) or device-to-device (D2D)) enables wireless devices to connect to each other in a P2P fashion without advance settings, participating in an infrastructure network, or wireless access points (APs). Devices supporting Wi-Fi direct can discover and notify each other of available services. Wi-Fi direct devices support typical Wi-Fi ranges and support the same data rate achieved by IEEE 802.11a, IEEE 802.11g or IEEE 802.11n infrastructure connection. When a device comes within a connection range of a Wi-Fi direct device, the device can connect to the Wi-Fi direct device by using a specified protocol.

When there are multiple devices supporting Wi-Fi direct in a wireless communication environment, a transmission within the infrastructure network will cause interference to a P2P transmission. In order to address this issue, a novel transmission schedule mechanism that can flexibly schedule transmission behaviors of multiple communication devices in the wireless communication environment to reduce the interference is urgently needed.

SUMMARY OF THE INVENTION

It is therefore one of the objectives of the present invention to provide a transmission schedule method that can effectively reduce transmission interference in a wireless communication environment, and an associated communication device, to address the above-mentioned issues.

According to an embodiment of the present invention, a communication device is provided, wherein the communication device respectively establishes a plurality of wireless communication connections with a plurality of predetermined devices in an infrastructure network, and comprises a wireless transceiver and a processor. The wireless transceiver is arranged to transmit or receive a plurality of wireless signals. The processor is arranged to select a spatial reuse mechanism, generate spatial reuse information according to the spatial reuse mechanism, and transmit at least one packet carrying the spatial reuse information to the plurality of predetermined devices. The spatial reuse information defines a pattern of a communication period. The communication period comprises a spatial reuse phase and a non-spatial reuse phase. The spatial reuse information comprises time information of at least one of the spatial reuse phase and the non-spatial reuse phase. In response to a selection of the spatial reuse mechanism, the processor suspends a wireless signal transmission with the plurality of predetermined devices during the spatial reuse phase.

According to an embodiment of the present invention, a communication device is provided, wherein the communication device comprises a wireless transceiver and a processor. The wireless transceiver is arranged to transmit or receive a plurality of wireless signals, wherein the plurality of wireless signals comprises a signal received from a wireless access point, and the signal comprises a packet carrying spatial reuse information. The processor is arranged to determine when to communicate with the wireless access point according to the spatial reuse information. The spatial reuse information defines a pattern of a communication period. The communication period comprises a spatial reuse phase and a non-spatial reuse phase. The spatial reuse information comprises time information of at least one of the spatial reuse phase and the non-spatial reuse phase. The processor communicates with the wireless access point during the non-spatial reuse phase, and communicates with a predetermined device during the spatial reuse phase.

According to an embodiment of the present invention, a transmission schedule method for a communication device is provided. The transmission schedule method comprises: selecting a spatial reuse mechanism and generating spatial reuse information according to the spatial reuse mechanism; transmitting at least one packet carrying the spatial reuse information, wherein the at least one packet is transmitted from the communication device to a plurality of predetermined devices within an infrastructure basic service set, the communication device is a wireless access point within the infrastructure basic service set, the communication device respectively establishes a plurality of wireless communication connections with the plurality of predetermined devices, the spatial reuse information defines a pattern of a communication period, the communication period comprises a spatial reuse phase and a non-spatial reuse phase, and the spatial reuse information comprises time information of at least one of the spatial reuse phase and the non-spatial reuse phase; performing a wireless signal transmission associated with the infrastructure basic service set during the non-spatial reuse phase; and suspending the wireless signal transmission associated with the infrastructure basic service set during the spatial reuse phase.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9 is an example of a spatial reuse map according to an embodiment of the present invention.

DETAILED DESCRIPTION

Figure 1:
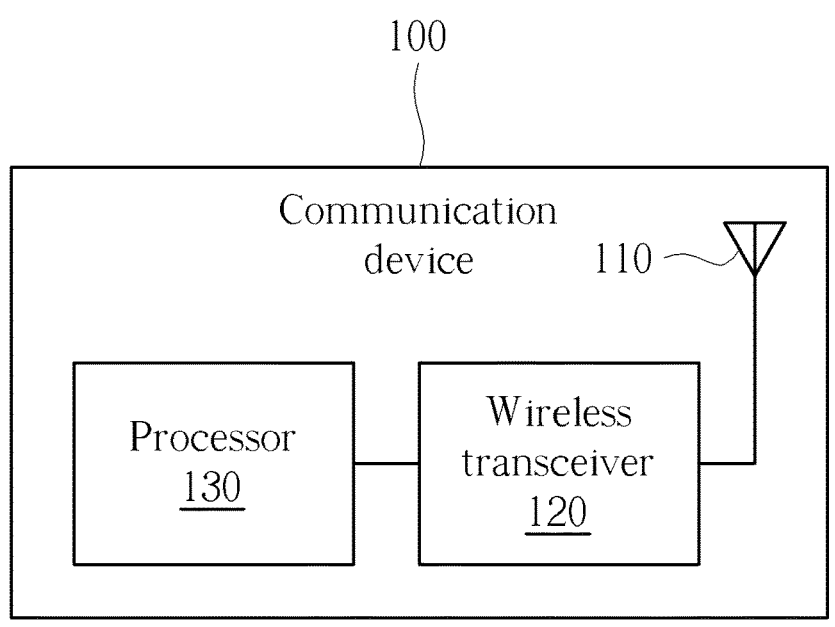
FIG. 1 is a block diagram of a communication device according to an embodiment of the present invention.

FIG. 1 is a block diagram of a communication device 100 according to an embodiment of the present invention, wherein the communication device 100 may include at least one antenna 110, a wireless transceiver 120, and a processor 130. The wireless transceiver 120 may transmit or receive a wireless signal through the antenna 110. The processor 130 may control operations of the communication device 100 by executing corresponding software or firmware. For example, the operations of the communication device 100 may include a connection establishment between the communication device 100 and a predetermined device (e.g., another communication device), and various operations, determinations, signal generations, signal processings, and signal transmissions during wireless communication.

It should be noted that FIG. 1 is a simplified communication device and only illustrates components related to the present invention. In practice, a communication device may further include components that are not shown in FIG. 1 and can implement wireless communication and associated signal processing.

The communication device 100 may operate according to the communication protocol specified by 802.11, and can be a device supporting a Wi-Fi direct protocol. In this embodiment, the communication device 100 may be arranged to implement a wireless access point (AP) in an infrastructure basic service set (BSS), and implement a station that accesses the network through the wireless AP in the infrastructure BSS. Under a condition that the communication device 100 acts as the station, the communication device 100 may perform peer-to-peer (P2P) communication with a predetermined device supporting Wi-Fi direct (e.g., another communication device, hereinafter referred to as a predetermined device) without the wireless AP.

In the transmission schedule method of the present invention, the wireless AP and the station have their own operations. As a result, in the following paragraphs, the transmission schedule method proposed by the present invention will be described by different embodiments in which the wireless AP and the station are implemented by the communication device 100, respectively. It should be noted that in the implementation of the communication device 100 as the wireless AP or the station, the communication device 100 may also include other identical or different components, and those skilled in the art can understand that what other components the communication device 100 may include when the communication device 100 is implemented as the wireless AP or the station. These components are not introduced in detailed for brevity.

In addition, the transmission schedule method of the present invention can separate phases within a communication period to effectively reduce transmission interference, wherein the phases may include a phase that can perform communication related to the infrastructure BSS (including a wireless signal transmission passing through the wireless AP) and a phase that can perform P2P communication (including a wireless signal transmission not passing through the wireless AP).

Figure 2:
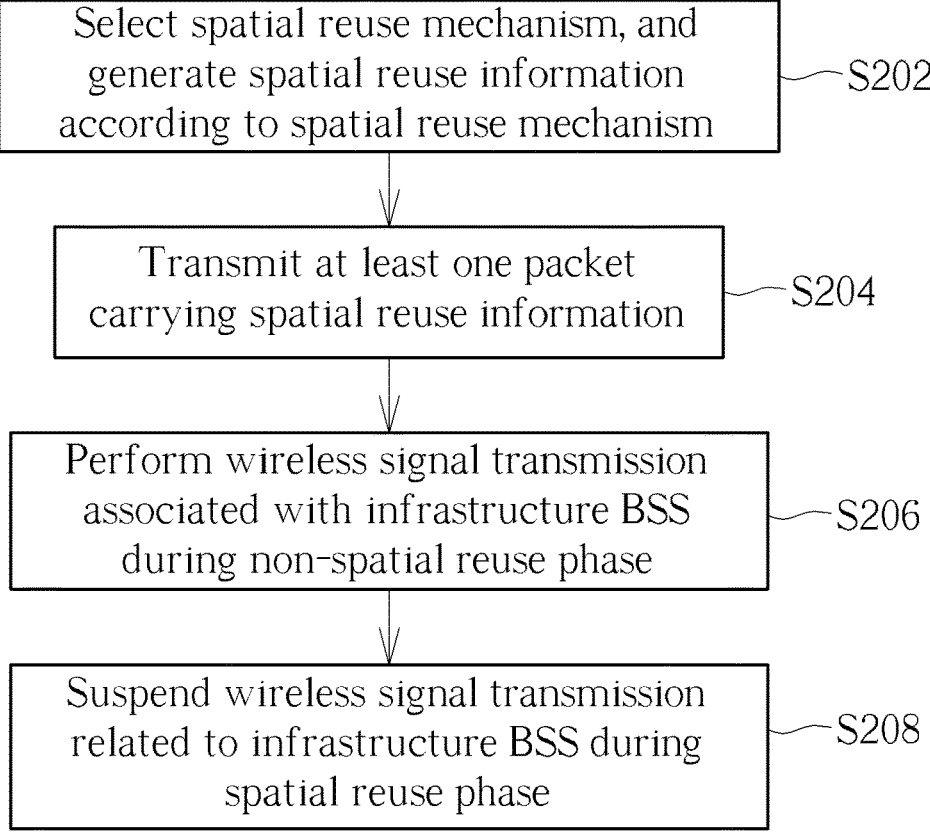
FIG. 2 is a flow chart of a transmission schedule method according to an embodiment of the present invention.

FIG. 2 is a flow chart of a transmission schedule method according to an embodiment of the present invention, wherein the transmission schedule method is applicable to the communication device 100 shown in FIG. 1. As mentioned above, in the transmission schedule method proposed by the present invention, the wireless AP and the station have their own operations. The transmission schedule method may include the following steps.

In Step S202, a spatial reuse mechanism is selected to generate spatial reuse information according to the selected space spatial mechanism.

In Step S204, at least one packet carrying the spatial reuse information is sent. In this embodiment, Steps S202 and S204 can be executed by a processor of a wireless AP within an infrastructure BSS. For a case where the communication device 100 acts as a wireless AP, the communication device 100 may establish a plurality of wireless communication connections with a plurality of predetermined devices, respectively. For example, in an infrastructure network, the communication device 100 may establish a wireless communication connection with each predetermined device within the infrastructure BSS, and transmit the packet to each predetermined device through the wireless communication connection.

The spatial reuse information defines a pattern of a communication period, wherein the communication period includes a spatial reuse phase and a non-spatial reuse phase. The spatial reuse information includes (predetermined) time information of at least one of the spatial reuse phase and the non-spatial reuse phase. For example, the pattern of the communication period shown in FIG. 3 can be illustrated by a communication period length and the (predetermined) time information of the at least one of the spatial reuse phase and the non-spatial reuse phase.

In Step S206, the wireless signal transmission related to the infrastructure BSS is performed during the non-spatial reuse phase. Since the non-spatial reuse phase allows the wireless signal transmission related to the infrastructure BSS, Step S206 can be performed by a processor of the station and/or the processor of the wireless AP within the infrastructure BSS.

In Step S208, the wireless signal transmission related to the infrastructure BSS is suspended during the spatial reuse phase. Since the spatial reuse phase does not allow the wireless signal transmission related to the infrastructure BSS, Step S208 can be performed by the processor of the station and/or the processor of the wireless AP within the infrastructure BSS. Specifically, the wireless AP does not perform the wireless signal transmission with other stations (e.g., the predetermined devices) during the spatial reuse phase. That is, the stations do not perform the wireless signal transmission with the wireless AP during the spatial reuse phase. In addition, the spatial reuse phase may be reserved for the stations to perform the P2P communication according to the Wi-Fi Direct protocol.

Figure 3:
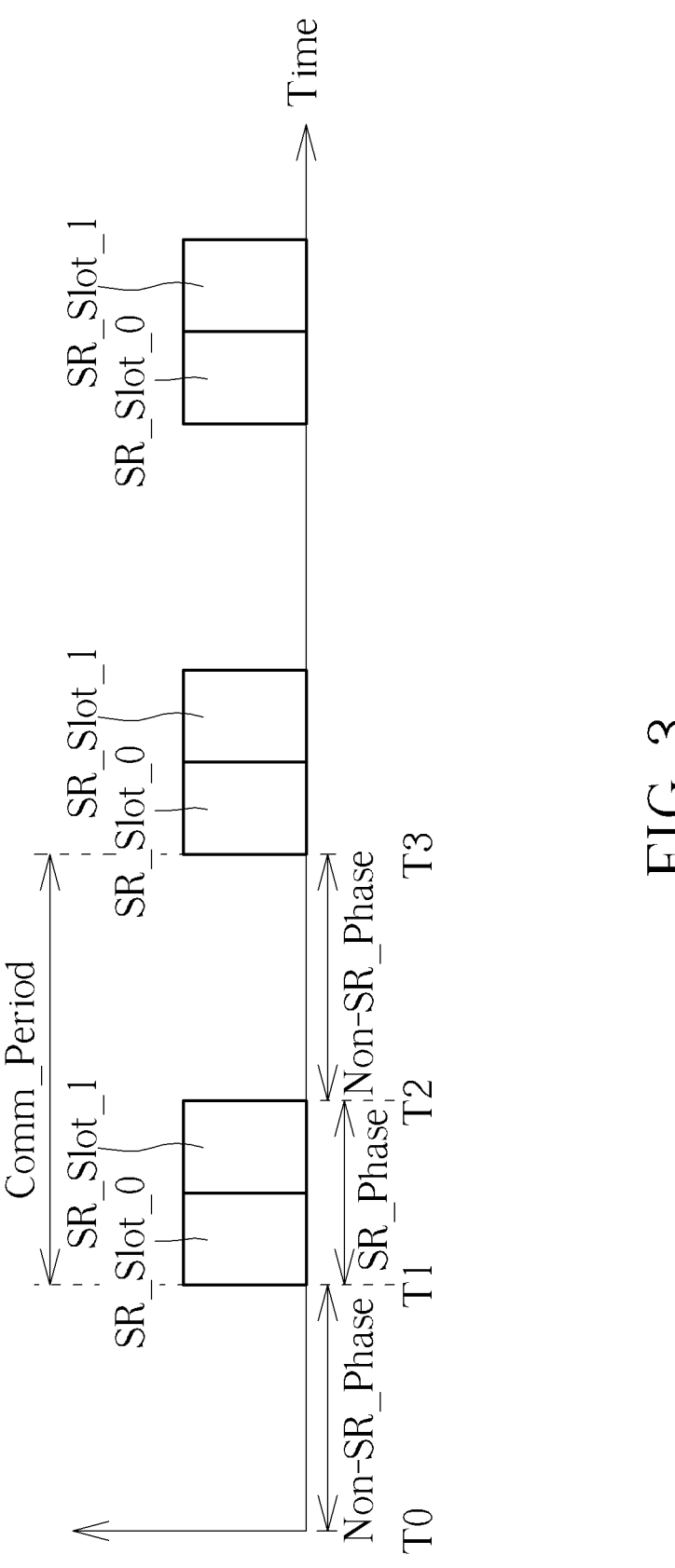
FIG. 3 is a timing diagram of a plurality of communication periods according to an embodiment of the present invention.

FIG. 3 is a timing diagram of a plurality of communication periods according to an embodiment of the present invention. In this embodiment, the wireless AP can separate the communication time of the infrastructure BSS into a plurality of communication periods Comm_Period by defining a length of one communication period Comm_Period, and each of the communication periods Comm_Period can be separated into a spatial reuse phase SR_Phase and a non-spatial reuse phase Non-SR_Phase. As shown in FIG. 3, a period from a time T0 to a time T1 can be configured as the non-spatial reuse phase Non-SR_Phase, a period from the time T1 to a time T2 can be configured as the spatial reuse phase SR_Phase, a period from the time T2 to a time T3 can be configured as the non-spatial reuse phase Non-SR_Phase, and so on. In addition, a period from the time T1 to the time T3 (or a period from the time T0 to the time T2) can be defined as one communication period Comm_Period.

The spatial reuse phase SR_Phase does not overlap the non-spatial reuse phase Non-SR_Phase. Additionally, the spatial reuse phase SR_Phase may include one or more spatial reuse time slots (e.g., spatial reuse time slots SR_Slot_0 and SR_Slot_1 shown in FIG. 3). In addition to the (predetermined) time information of the at least one of the spatial reuse phase and the non-spatial reuse phase, the spatial reuse information may further include (predetermined) time information of the spatial reuse time slots.

The processor of the wireless AP may allocate at least one spatial reuse time slot to each predetermined device. For example, the processor may allocate at least one spatial reuse time slot to each predetermined device according to a characteristic of a wireless communication connection of each predetermined device, or allocate at least one spatial reuse time slot to multiple predetermined devices according to characteristics of wireless communication connections of the predetermined devices, wherein the characteristic of wireless communication connection may include a quality (e.g., a signal-to-noise ratio (SNR)), a direction or an energy of a wireless signal received from a corresponding predetermined device, or whether the wireless signal is interfered with by wireless communication operations of other devices.

Specifically, the processor of the wireless AP may determine a position of a predetermined device (e.g., a station) or relative positions of multiple predetermined devices according to a direction or an energy of a wireless signal received by the predetermined device, and allocate at least one spatial reuse time slot according to the position of the predetermined device or the relative positions of the multiple predetermined devices, so that the P2P communication can be performed within the allocated spatial reuse time slot according to the Wi-Fi direct protocol. In some embodiments, the processor of the wireless AP may determine a transmission energy according to an energy of a wireless signal received by a predetermined device, estimate a transmission range or a communication range according to the transmission energy, and allocate at least one spatial reuse time slot to each predetermined device according to the transmission range or the communication range of the predetermined device, so that the P2P communication can be performed within the allocated spatial reuse time slot according to the Wi-Fi direct protocol.

Different spatial reuse time slots may be allocated to multiple predetermined devices in close proximity, a close transmission range, or a close communication range. For example, the processor of the wireless AP may allocate different spatial reuse time slots to two predetermined devices with overlapping communication ranges. For predetermined devices that are sufficiently far apart (e.g., greater than a predetermined distance), the processor of the wireless AP may allocate the same spatial reuse time slot to the predetermined devices. For example, the processor may allocate the same spatial reuse time slot to two predetermined devices whose communication ranges do not overlap or only slightly overlap.

In addition, the processor of the wireless AP may determine whether a wireless signal transmission of each predetermined device is interfered with by a wireless signal transmission of another predetermined device (e.g., according to whether the interference occurs, or according to the wireless signal quality). When it is determined that a first wireless signal transmission of a first predetermined device (or at least one first predetermined device) is interfered with by a second wireless signal transmission of a second predetermined device (or at least one second predetermined device), the processor of the wireless AP may allocate different spatial reuse time slots to the first predetermined device (or the at least one first predetermined device) and the corresponding second predetermined device (or the at least one second predetermined device). When it is determined that the first wireless signal transmission of the first predetermined device (or the at least one first predetermined device) is not interfered with by the second wireless signal transmission of the second predetermined device (or the at least one second predetermined device), the processor of the wireless AP may allocate the same spatial reuse time slot to the first predetermined device (or the at least one first predetermined device) and the corresponding second predetermined device (or the at least one second predetermined device).

In this way, P2P communication that interferes with each other can be staggered through the allocation of the spatial reuse time slots (i.e., the P2P communications do not overlap with each other). It should be noted that the processor of the wireless AP may also determine whether the first wireless signal transmission of the first predetermined device is interfered with by the second wireless signal transmission of one or more second predetermined devices, and allocate the spatial reuse time slots by using a similar method. As a result, the present invention can not only solve the problem of one-to-one transmission interference, but also solve the problems of many-to-one transmission interference, one-to-many transmission interference, and many-to-many transmission interference.

In addition, the processor of the wireless AP may select a corresponding spatial reuse mechanism, determine a length of the spatial reuse phase SR_Phase, and/or configure a number of spatial reuse time slots within the spatial reuse phase SR_Phase according to a density or a number of predetermined devices (e.g., stations).

In this embodiment, the predetermined devices (e.g., the stations) may actively request the wireless AP to configure the spatial reuse time slots. In some embodiments, the wireless AP may dynamically select the corresponding spatial reuse mechanism and configure the spatial reuse time slots according to the density or the number of predetermined devices (e.g., the stations) without requests of the stations.

Figure 4:
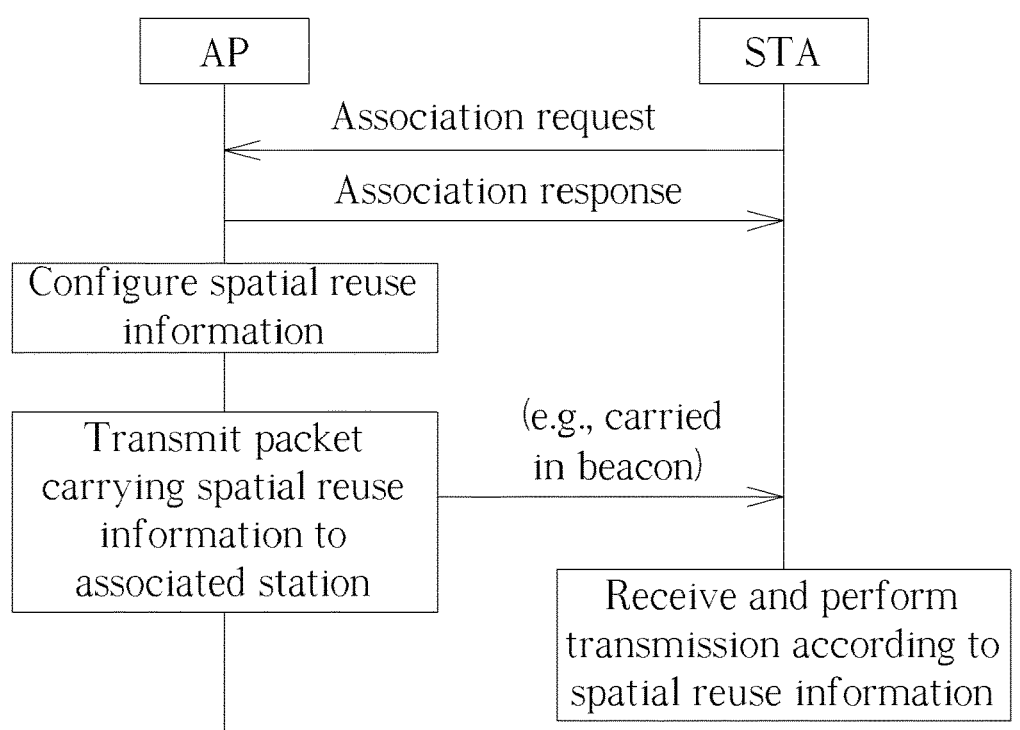
FIG. 4 is an example of message flow that enables a wireless access point to actively select a spatial reuse mechanism and configure spatial reuse time slots according to an embodiment of the present invention.

FIG. 4 is an example of message flow that enables a wireless AP to actively select a spatial reuse mechanism and configure spatial reuse time slots according to an embodiment of the present invention. In response to an association request frame transmitted by a station (labeled as "STA" in FIG. 4), a wireless AP (labeled as "AP" in FIG. 4) may transmit an association response frame as a response.

The processor of the wireless AP may configure spatial reuse information (which may include selecting a spatial reuse mechanism, arranging or scheduling at least one spatial reuse phase and at least one non-spatial reuse phase within a communication period with a predetermined length, and/or allocating one or more spatial reuse time slots within the spatial reuse phase) according to a current status of stations within the infrastructure network (e.g., a combination or at least one of the station density, the number of stations, the positions or relative positions of the stations, and the signal transmission range or the communication range of each station). In addition, the processor of the wireless AP may generate the spatial reuse information for the stations according to the selected spatial reuse mechanism.

The processor of the wireless AP may transmit a packet carrying the spatial reuse information to an associated station through unicast or broadcast. According to an embodiment, the wireless AP may transmit the spatial reuse information to the associated station through a beacon. According to some embodiments, the wireless AP may transmit the spatial reuse information to the associated station through any frame before the station receives the beacon. It should be noted that, even if a station has not yet established any P2P group, the wireless AP may still allocate one or more spatial reuse time slots to the station.

After obtaining the spatial reuse information, the processor of the station may derive the pattern of the communication period according to the spatial reuse information. As a result, the processor of the station may determine when to communicate with the wireless AP, determine when to perform the P2P communication with predetermined devices other than the wireless AP, and perform the subsequent wireless communication according to the spatial reuse information. In an embodiment of the present invention, the processor of the station may communicate with the wireless AP during the non-spatial reuse phase. In addition, the processor of the station may further derive information such as a predetermined time of the allocated spatial reuse time slot according to the spatial reuse information, to determine in which spatial reuse time slot of the spatial reuse phase the station can perform the P2P communication with other predetermined devices.

Similarly, in response to the selection of the spatial reuse mechanism, the processor of the wireless AP may communicate with the station during the non-spatial reuse phase, and suspend the wireless signal transmission with the station during the spatial reuse phase.

Figure 5:
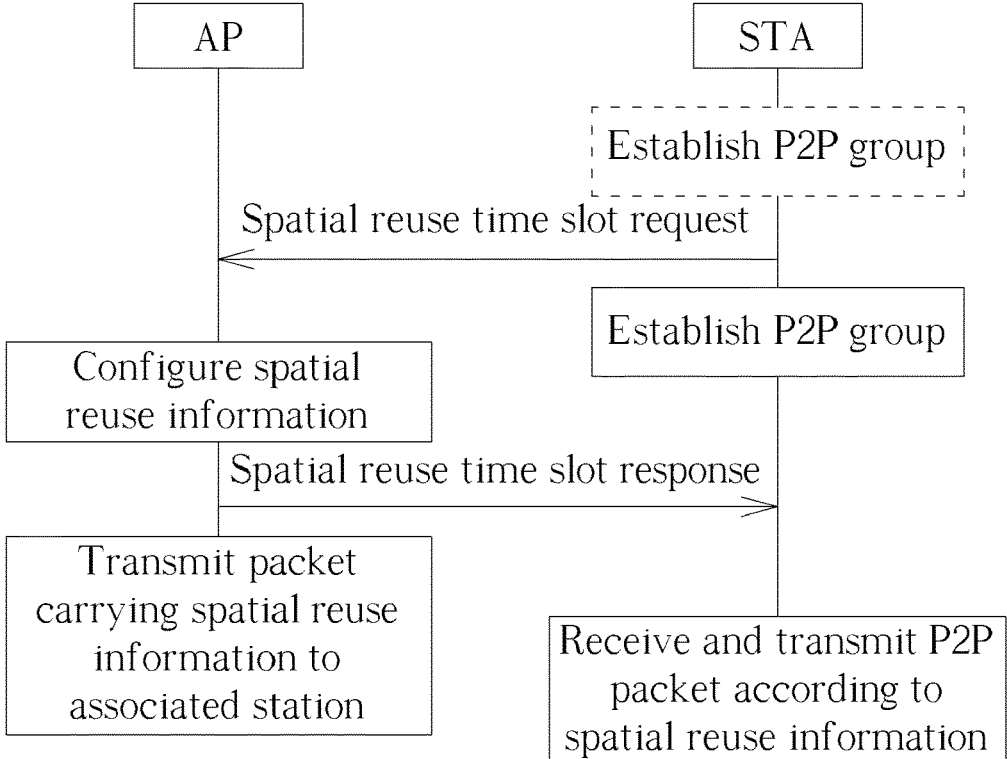
FIG. 5 is an example of message flow that enables a station to actively request a wireless access point to configure spatial reuse time slots according to an embodiment of the present invention.

FIG. 5 is an example of message flow that enables a station to actively request a wireless AP to configure spatial reuse time slots according to an embodiment of the present invention. In this embodiment, the station (labeled as "STA" in FIG. 5) may request the wireless AP (labeled as "AP" in FIG. 5) to configure the spatial reuse time slots in a signal handshake process, and may transmit a spatial reuse time slot request to the wireless AP before or after the P2P group is established.

In response to the spatial reuse time slot request, the wireless AP may configure, generate, and transmit the spatial reuse information to the station. The processor of the wireless AP may configure the spatial reuse information (which may include selecting a spatial reuse mechanism, arranging or scheduling at least one spatial reuse phase and at least one non-spatial reuse phase within a communication period with a predetermined length, and/or allocating one or more spatial reuse time slots within the spatial reuse phase) according to a current status of stations within the infrastructure network (e.g., a combination or at least one of the station density, the number of stations, the positions or relative positions of the stations, and the signal transmission range or the communication range of each station).

The processor of the wireless AP may transmit a spatial reuse time slot response frame to the station, and transmit a packet carrying the spatial reuse information to an associated station through unicast or broadcast. It should be noted that the processor of the wireless AP may make the spatial reuse information be carried in any frame transmitted to the station, or may make the spatial reuse information be carried in the spatial reuse time slot response frame.

After obtaining the spatial reuse information, the processor of the station may derive the pattern of the communication period according to the spatial reuse information, and further derive information related to a predetermined time of the allocated spatial reuse time slot, in order to determine in which spatial reuse time slot of the spatial reuse phase the station can perform the P2P communication with other predetermined devices.

According to an embodiment of the present invention, the wireless AP may determine a position of each station in the infrastructure network through an indoor positioning mechanism, and allocate resources (e.g., the spatial reuse time slots) according to the station position.

Figure 6:
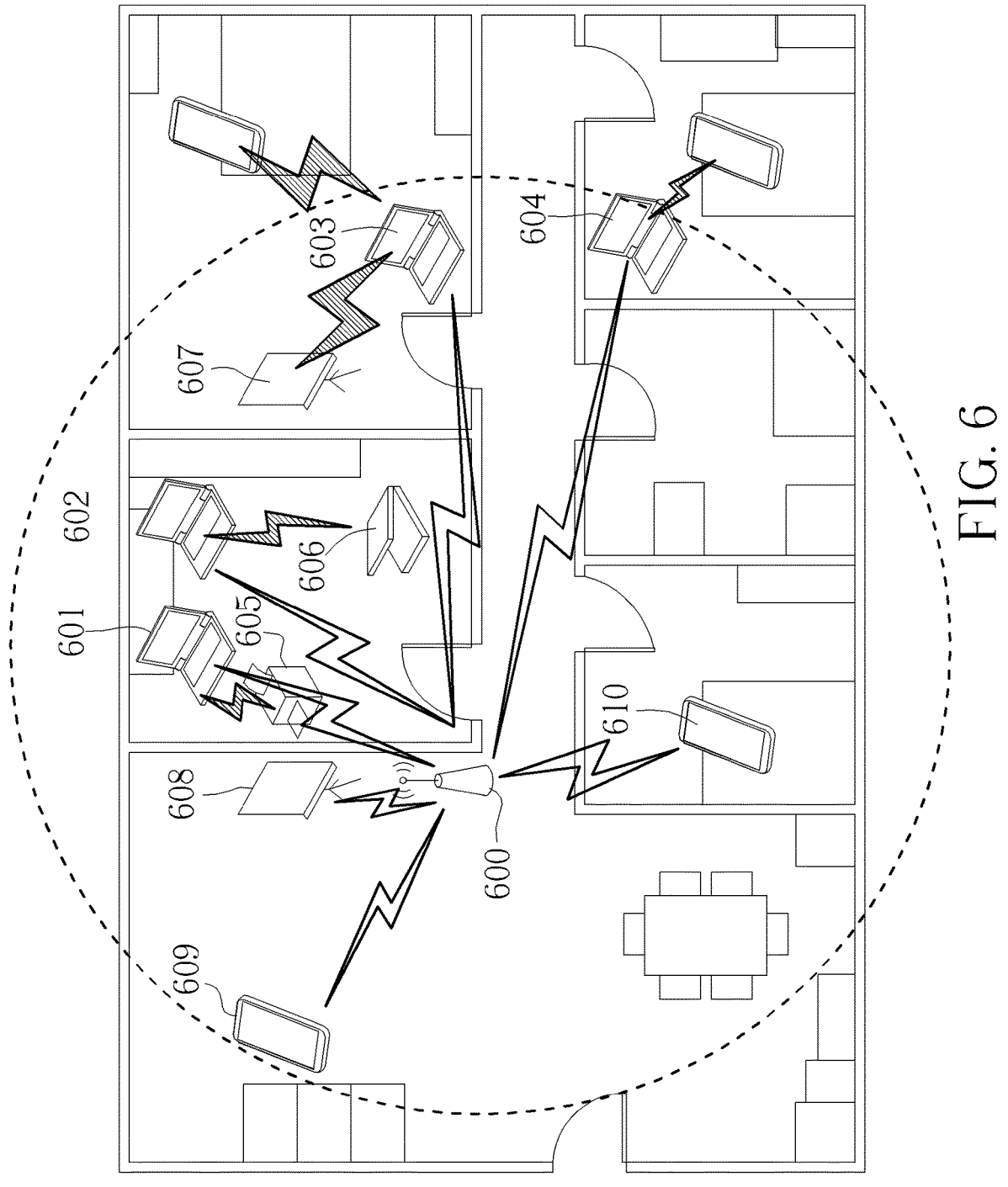
FIG. 6 is a diagram illustrating a plurality of communication devices configured in an infrastructure network according to an embodiment of the present invention.

FIG. 6 is a diagram illustrating a plurality of communication devices configured in an infrastructure network according to an embodiment of the present invention. As shown in FIG. 6, the infrastructure network is set up in a home environment, and the home environment can be configured with a wireless AP 600 and multiple devices, such as computer devices 601, 602, 603, and 604, a printer 605, a scanner 606, digital televisions (TVs) 607 and 608, and cell phones 609 and 610, wherein the computer devices 601, 602, 603, and 604, the digital TV 608, and the cell phones 609 and 610 may act as stations associated with the wireless AP 600. In addition, the computer device 601 may perform the P2P transmission with the printer 605, the computer device 602 may perform the P2P transmission with the scanner 606, the computer device 603 may perform the P2P transmission with the digital TV 607, and the computer devices 603 and 604 may perform the P2P transmission with other cell phones that are not within a communication range of the wireless AP 600, wherein the lightning shapes filled with diagonal lines in FIG. 6 represent the P2P transmissions.

Figure 7:
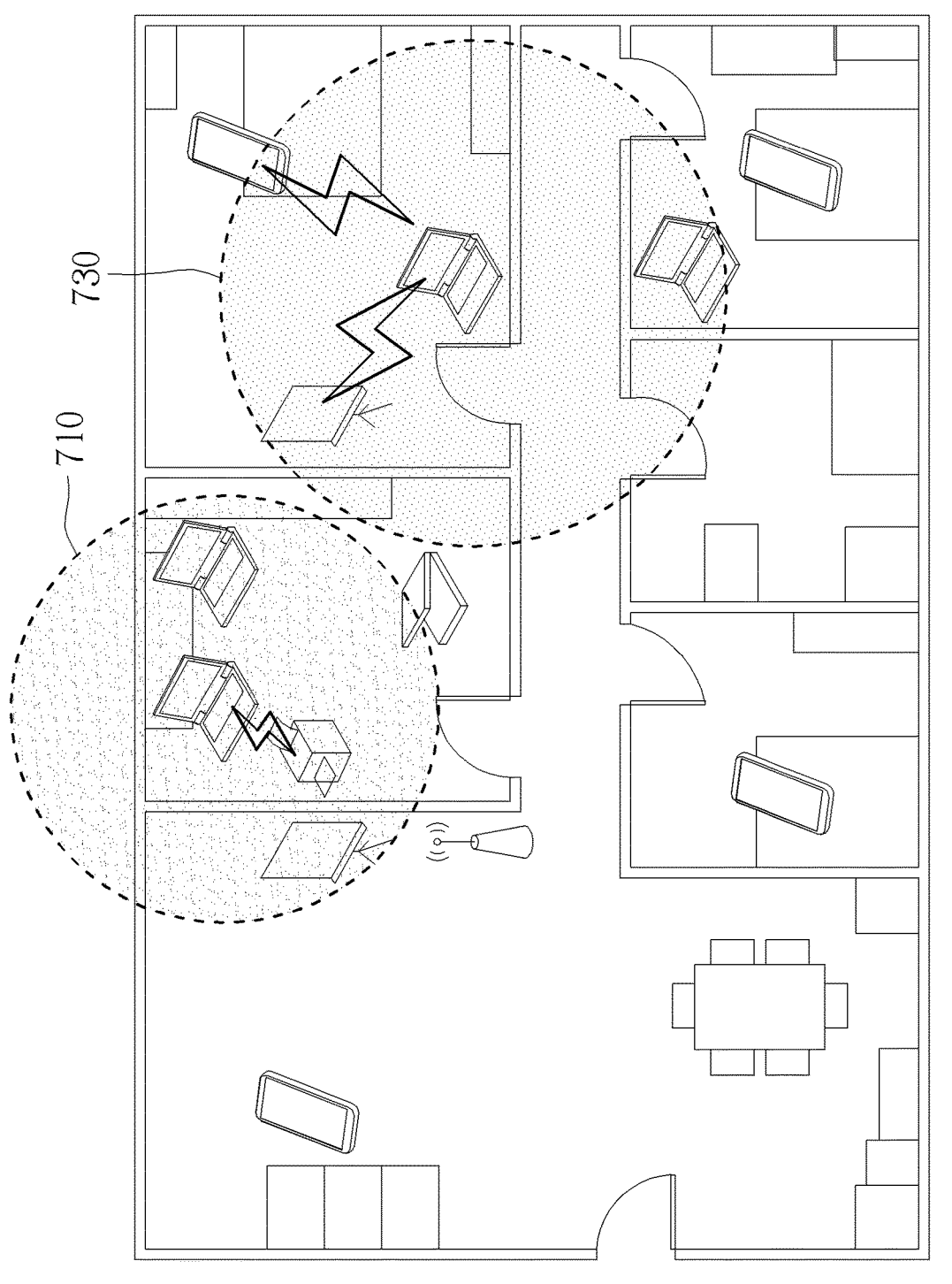
FIG. 7 is a diagram illustrating communication ranges of a plurality of communication devices configured in an infrastructure network according to an embodiment of the present invention.
Figure 8:
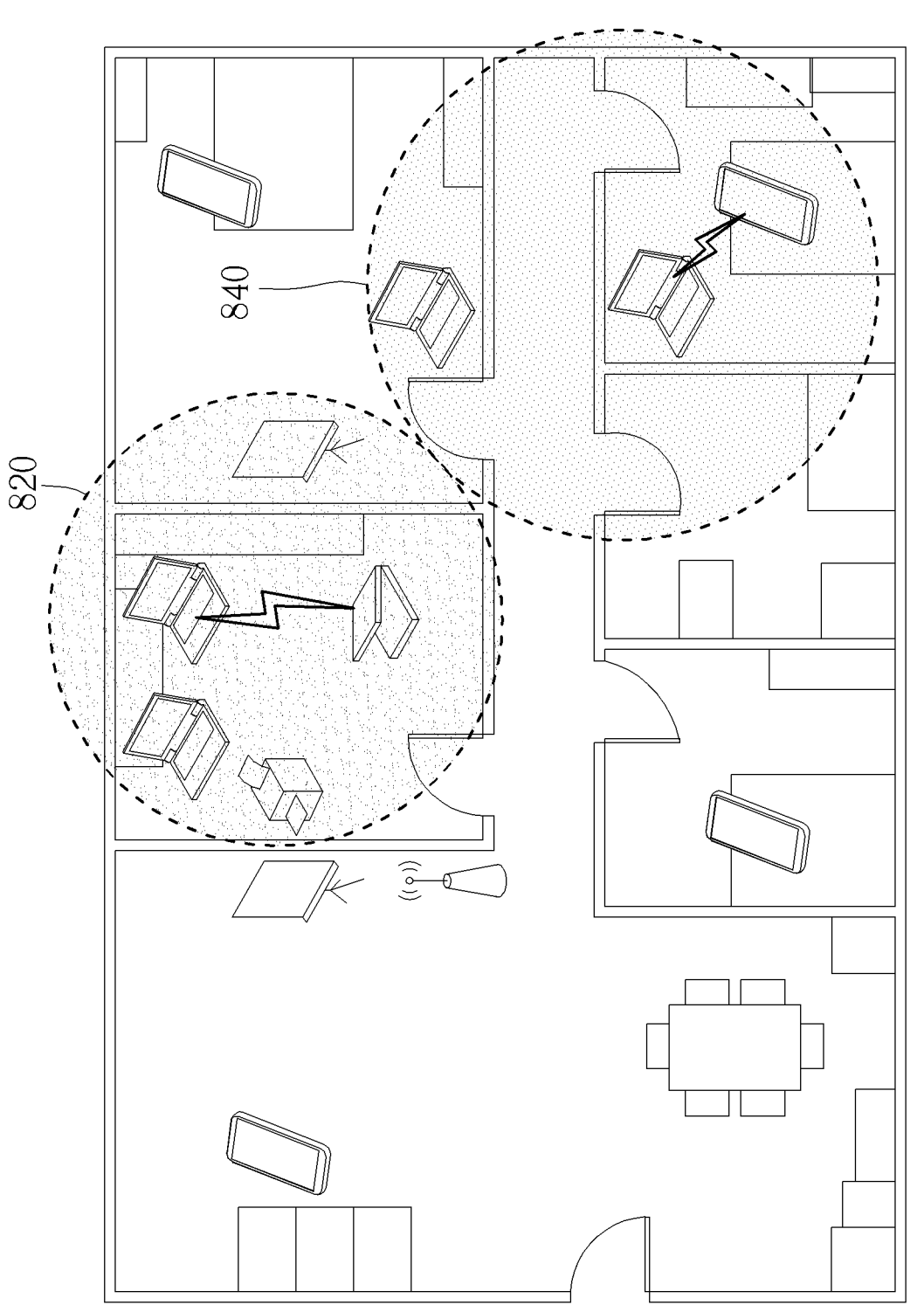
FIG. 8 is a diagram illustrating communication ranges of a plurality of communication devices configured in an infrastructure network according to another embodiment of the present invention.

In FIG. 6, a dotted circle outlines the communication range of the wireless AP 600. FIG. 7 is a diagram illustrating communication ranges of a plurality of communication devices configured in an infrastructure network according to an embodiment of the present invention, wherein FIG. 7 illustrates a communication range 710 of the computer device 601 and a communication range 730 of the computer device 603. FIG. 8 is a diagram illustrating communication ranges of a plurality of communication devices configured in an infrastructure network according to another embodiment of the present invention, wherein FIG. 8 illustrates a communication range 820 of the computer device 602 and a communication range 840 of the computer device 604.

As shown in FIG. 7 and FIG. 8, the communication ranges of the computer devices 601 and 603 do not overlap, the communication ranges of the computer devices 601 and 604 do not overlap, and the communication ranges of the computer devices 602 and 604 do not overlap. Since the communication range of the computer device 601 overlaps the communication range of the computer device 602, the signal transmissions of the computer devices 601 and 602 may interfere with each other. Since the communication range of the computer device 602 overlaps the communication range of the computer device 601 and the communication range of the computer device 603, the signal transmission of the computer device 602 may be interfered with by the signal transmissions of the computer devices 601 and 603. Similarly, since the communication range of the computer device 603 overlaps the communication range of the computer device 602 and the communication range of the computer device 604, the signal transmission of the computer device 603 may be interfered with by the signal transmissions of the computer devices 602 and 604. Since the communication range of the computer device 604 overlaps the communication range of the computer device 603, the signal transmissions of the computer devices 604 and 603 may interfere with each other.

After determining the position of each station in the infrastructure network through the indoor positioning mechanism, the wireless AP 600 may allocate the spatial reuse time slots according to the station position. For example, the wireless AP 600 may allocate different spatial reuse time slots to stations in close proximity or stations with overlapping communication ranges (e.g., the computer devices 601 and 602, the computer devices 602 and 603, or the computer devices 603 and 604). In addition, the wireless AP 60 may allocate the same spatial reuse time slot to stations that are sufficiently far apart or stations with non-overlapping communication ranges (e.g., the computer devices 601 and 603, the computer devices 601 and 604, or the computer devices 602 and 604).

According to another embodiment of the present invention, the wireless AP 600 may determine which device's wireless signal transmission will interfere with the wireless signal transmission of each station, allocate different spatial reuse time slots to two stations that are interfered with by each other, and allocate the same spatial reuse time slot to two stations that are not interfered with by each other. For example, the computer devices 601 and 602 are interfered with by each other, the computer devices 602 and 603 are interfered with by each other, the computer devices 603 and 604 are interfered with by each other, the computer devices 601 and 603 are not interfered with by each other, the computer devices 601 and 604 are not interfered with by each other, and the computer devices 602 and 604 are not interfered with by each other Assume that allocated association identities (AID) of the computer devices 601, 602, 603, and 604 are AID1, AID2, AID3, and AID4, respectively. The wireless AP 600 may describe (e.g., record) a time slot allocation result in a spatial reuse map (SRM), and use the SRM as part of the spatial reuse information to be transmitted to the computer devices 601-604.

Figure 9:
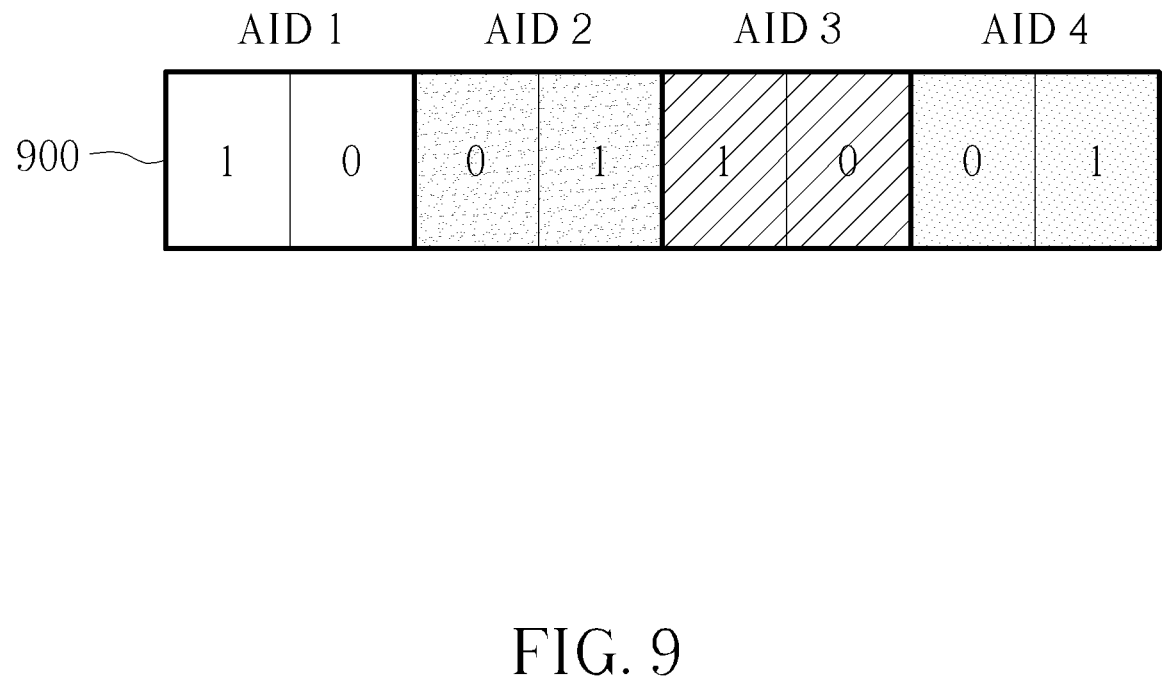

FIG. 9 is an example of an SRM according to an embodiment of the present invention. In this embodiment, two spatial reuse time slots may be configured to one spatial reuse phase. As a result, the wireless AP may represent the configuration of the spatial reuse time slots by using a set of two bits, wherein each bit corresponds to a spatial reuse time slot, and a value of each bit may represent whether a corresponding communication device can use the spatial reuse time slot. For example, value "1" represents the corresponding communication device can use the spatial reuse time slot, and value "0" represents the corresponding communication device cannot use the spatial reuse time slot.

Take an SRM 900 as an example. The SRM 900 may include 8 bits, wherein the $1^{st}$-$2^{nd}$ bits are a set of bits corresponding to a communication device with the association identifier AID1, the $3^{rd}$-$4^{th}$ bits are a set of bits corresponding to a communication device with the association identifier AID2, the $5^{th}$-$6^{th}$ bits are a set of bits corresponding to a communication device with the association identifier AID3, and the $7^{th}$-$8^{th}$ bits are a set of bits corresponding to a communication device with the association identifier AID4. The following information can be derived by contents of the SRM 900. The computer device 601 can use the first spatial reuse time slot of a spatial reuse phase, and cannot use the second spatial reuse time slot of the spatial reuse phase. The computer device 602 can use the second spatial reuse time slot of the spatial reuse phase, and cannot use the first spatial reuse time slot of the spatial reuse phase. The computer device 603 can use the first spatial reuse time slot of the spatial reuse phase, and cannot use the second spatial reuse time slot of the spatial reuse phase. The computer device 604 can use the second spatial reuse time slot of the spatial reuse phase, and cannot use the first spatial reuse time slot of the spatial reuse phase.

In other words, the wireless AP 600 may allocate the same spatial reuse time slot to the computer devices 601 and 603 that are sufficiently far apart and with non-overlapping communication ranges, allocate the same spatial reuse time slot to the computer devices 602 and 604 that are sufficiently far apart and with non-overlapping communication ranges, allocate different spatial reuse time slots to the computer devices 601 and 602 that are in close proximity and with overlapping communication ranges (or are interfered with each other), allocate different spatial reuse time slots to computer devices 602 and 603 that are in close proximity and with overlapping communication ranges (or are interfered with each other), and allocate different spatial reuse time slots to computer devices 603 and 604 that are in close proximity and with overlapping communication ranges (or are interfered with each other).

In this way, the P2P transmission performed by each station during the spatial reuse phase (e.g., the P2P transmission between the computer device 601 and the printer 605 and the P2P transmission between the computer device 602 and the scanner 606) does not interfere with other. In addition, the wireless signal transmission associated with the infrastructure BSS (e.g., the signal transmission between each station and the wireless AP) is not interfered with by the P2P transmission performed by each station.

In addition to the SRM, the spatial reuse information may further include at least one of the following information: a starting time or a predetermined time of a spatial reuse phase or a non-spatial reuse phase, a length of a communication period, a number of spatial reuse time slots configured in a spatial reuse phase, a length of a spatial reuse phase, and a length of a non-spatial reuse phase.

The wireless AP may further limit the maximum transmission energy of each P2P group, and use the limitation of the maximum transmission energy as a part of the spatial reuse information to be transmitted to associated stations. In addition, the wireless AP may further allocate usable spatial reuse time slots to a station according to a transmission energy of a P2P group associated with the station. Additionally, the wireless AP may further determine a communication range of a station according to a position and a transmission energy of the station, or determine a communication range of a station according to a position and a fixed transmission radius of the station.

In summary, the wireless AP can continuously monitor movement of each station according to the characteristic of the wireless communication connection with each associated station and correspondingly update the configuration of the spatial reuse time slots and the spatial reuse phase, to dynamically adjust the spatial reuse mechanism. In this way, transmission behaviors of multiple communication devices in the wireless communication environment can be flexibly scheduled to solve the transmission interference problem and effectively improve the overall transmission performance.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A communication device, respectively establishing a plurality of wireless communication connections with a plurality of predetermined devices in an infrastructure network, comprising:

a wireless transceiver, arranged to transmit or receive a plurality of wireless signals; and a processor, arranged to select a spatial reuse mechanism, generate spatial reuse information according to the spatial reuse mechanism, and transmit at least one packet carrying the spatial reuse information to the plurality of predetermined devices;

wherein the spatial reuse information defines a pattern of a communication period, the communication period comprises a spatial reuse phase and a non-spatial reuse phase, and the spatial reuse information comprises time information of at least one of the spatial reuse phase and the non-spatial reuse phase;

wherein in response to the selection of the spatial reuse mechanism, the processor suspends a wireless signal transmission with the plurality of predetermined devices during the spatial reuse phase;

wherein the spatial reuse phase comprises a plurality of spatial reuse time slots, and the spatial reuse information further comprises time information of the plurality of spatial reuse time slots.

2. The communication device of claim 1, wherein the processor allocates at least one of the plurality of spatial reuse time slots to each of the plurality of predetermined devices according to a characteristic of the plurality of wireless communication connections.

3. The communication device of claim 2, wherein the characteristic of the plurality of wireless communication connections comprises an energy or a direction of a wireless signal received by a corresponding predetermined device in the plurality of predetermined devices.

4. The communication device of claim 2, wherein the processor allocates different spatial reuse time slots to at least one adjacent predetermined device in the plurality of determined devices.

5. The communication device of claim 2, wherein the processor allocates a same spatial reuse time slot to at least one predetermined device that is sufficiently far apart in the plurality of determined devices.

6. A communication device, comprising:

a wireless transceiver, arranged to transmit or receive a plurality of wireless signals, wherein the plurality of wireless signals comprises a signal received from a wireless access point, and the signal comprises a packet carrying spatial reuse information; and a processor, arranged to determine when to communicate with the wireless access point according to the spatial reuse information;

wherein the spatial reuse information defines a pattern of a communication period, the communication period comprises a spatial reuse phase and a non-spatial reuse phase, and the spatial reuse information comprises time information of at least one of the spatial reuse phase and the non-spatial reuse phase;

wherein the processor communicates with the wireless access point during the non-spatial reuse phase, and communicates with a predetermined device during the spatial reuse phase;

wherein the spatial reuse phase comprises a plurality of spatial reuse time slots, and the spatial reuse information further comprises time information of the plurality of spatial reuse time slots.

7. The communication device of claim 6, wherein the processor determines in which of the plurality of spatial reuse time slots to communicate with the predetermined device according to the spatial reuse information.

8. The communication of claim 6, wherein the processor performs a peer-to-peer communication with the predetermined device according to a Wi-Fi direct protocol.

9. The communication of claim 6, wherein the spatial reuse phase does not overlap the non-spatial reuse phase.

10. A transmission schedule method for a communication device, comprising:

selecting a spatial reuse mechanism and generating spatial reuse information according to the spatial reuse mechanism;

transmitting at least one packet carrying the spatial reuse information, wherein the at least one packet is transmitted from the communication device to a plurality of predetermined devices within an infrastructure basic service set, the communication device is a wireless access point within the infrastructure basic service set, the communication device respectively establishes a plurality of wireless communication connections with the plurality of predetermined devices, the spatial reuse information defines a pattern of a communication period, the communication period comprises a spatial reuse phase and a non-spatial reuse phase, and the spatial reuse information comprises time information of at least one of the spatial reuse phase and the non-spatial reuse phase;

performing a wireless signal transmission associated with the infrastructure basic service set during the non-spatial reuse phase; and suspending the wireless signal transmission associated with the infrastructure basic service set during the spatial reuse phase;

wherein the spatial reuse phase comprises a plurality of spatial reuse time slots, and the spatial reuse information further comprises time information of the plurality of spatial reuse time slots.

11. The transmission schedule method of claim 10, further comprising:

allocating at least one of the plurality of spatial reuse time slots to the plurality of predetermined devices according to a characteristic of the plurality of wireless communication connections.

12. The transmission schedule method of claim 11, wherein the characteristic of the plurality of wireless communication connections comprises an energy or a direction of a wireless signal received by a corresponding predetermined device in the plurality of predetermined devices.

13. The transmission schedule method of claim 11, further comprising:

determining whether a first wireless signal transmission of a first predetermined device in the plurality of predetermined devices is interfered with by a second wireless signal transmission of a second predetermined device in the plurality of predetermined devices; and in response to determining the first wireless signal transmission of the first predetermined device being interfered with by the second wireless signal transmission of the second predetermined device, allocating different spatial reuse time slots to the first predetermined device and the second predetermined device.

14. The transmission schedule method of claim 13, further comprising:

in response to determining the first wireless signal transmission of the first predetermined device not being interfered with by the second wireless signal transmission of the second predetermined device, allocating a same spatial reuse time slot to the first predetermined device and the second predetermined device.

15. The transmission schedule method of claim 11, further comprising:

performing a peer-to-peer communication in an allocated spatial reuse time slot according to a Wi-Fi direct protocol.

* * * * *